US011225921B2

(12) United States Patent
Han et al.

(10) Patent No.: US 11,225,921 B2
(45) Date of Patent: Jan. 18, 2022

(54) ENGINE EXHAUST TREATMENT THROUGH TEMPERATURE MANAGEMENT (71) Applicant: Woodward, Inc., Fort Collins, CO (US)

(72) Inventors: Yi Han, Fort Collins, CO (US); James Po-Chang Chiu, Longmont, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 16/887,587

(22) Filed: May 29, 2020

(65) Prior Publication Data
US 2021/0372336 A1 Dec. 2, 2021

(51) Int. Cl.
*F02D 41/00* (2006.01)
*F02M 35/10* (2006.01)
(Continued)

(52) U.S. Cl.
CPC ......... *F02D 41/0077* (2013.01); *F01N 13/10* (2013.01); *F02D 9/08* (2013.01);
(Continued)

(58) Field of Classification Search
CPC ............. F02D 41/0077; F02D 41/0002; F02D 41/005; F02D 9/08; F02M 26/05;
(Continued)

(56) References Cited

U.S. PATENT DOCUMENTS 4,924,840 A * 5/1990 Wade ...................... F02D 21/08
123/568.2
5,329,912 A * 7/1994 Matsumoto ...... F02M 35/10222
123/568.27
(Continued)

FOREIGN PATENT DOCUMENTS

DE 102015216851 8/2016
DE 102017202054 8/2018

OTHER PUBLICATIONS

English Machine Translation to Schroder (Pub. Number DE 10 2017 202 054 A1), published on Aug. 9, 2018.*
(Continued)

*Primary Examiner* — Thai Ba Trieu
(74) *Attorney, Agent, or Firm* — Fish & Richardson P.C.

(57) ABSTRACT

The subject matter of this specification can be embodied in, among other things, an engine system that includes an intake manifold configured to receive and convey air to a combustion chamber, an intake valve upstream of the intake manifold and configured to regulate an air flow into the intake manifold, an exhaust manifold configured to receive combustion products from the combustion chamber, a recirculation flow passage configured to convey exhaust gasses from the exhaust manifold to the intake manifold, a recirculation flow control valve configured to regulate gas flow through the recirculation flow passage, and a controller configured to determine that the engine system is in a motoring condition, open, during the motoring condition and based the determining, the recirculation flow control valve, and close, during the motoring condition and based the determining, the intake valve.

17 Claims, 4 Drawing Sheets

(51) Int. Cl.
  *F02D 9/08* (2006.01)
  *F02M 26/22* (2016.01)
  *F02M 26/05* (2016.01)
  *F01N 13/10* (2010.01)
  *F02M 35/104* (2006.01)

(52) U.S. Cl.
  CPC ......... *F02D 41/0002* (2013.01); *F02M 26/05* (2016.02); *F02M 26/22* (2016.02); *F02M 35/104* (2013.01); *F02M 35/10222* (2013.01)

(58) Field of Classification Search
  CPC ............. F02M 26/22; F02M 35/10222; F02M 35/104; F01N 13/10
  USPC .............. 60/323, 280, 285, 605.2; 701/108; 123/568.12, 568.21
  See application file for complete search history.

(56) References Cited

U.S. PATENT DOCUMENTS

| | | | | |
|---|---|---|---|---|
| 6,244,243 | B1* | 6/2001 | Mamiya | F02D 41/0002 123/295 |
| 6,289,883 | B1* | 9/2001 | Wakutani | F02D 41/0007 123/568.21 |
| 6,560,960 | B2* | 5/2003 | Nishimura | F02D 41/024 60/285 |
| 7,836,693 | B2* | 11/2010 | Fujita | F02M 26/06 60/605.2 |
| 7,886,524 | B2* | 2/2011 | van Nieuwstadt | F02D 41/0065 60/285 |
| 7,937,207 | B2* | 5/2011 | Nishiumi | F02M 26/05 701/108 |
| 8,001,953 | B2* | 8/2011 | Murata | F02M 26/05 123/568.21 |
| 8,156,925 | B2* | 4/2012 | Tabata | F02B 39/14 123/568.19 |
| 2010/0070122 | A1* | 3/2010 | Niimi | B60W 10/08 701/22 |
| 2010/0139267 | A1* | 6/2010 | Schliesche | F02M 26/15 60/602 |
| 2010/0199639 | A1* | 8/2010 | Matsunaga | F02M 26/05 60/278 |
| 2011/0054762 | A1* | 3/2011 | Nakayama | F02M 26/45 701/108 |
| 2012/0046854 | A1* | 2/2012 | Sangkyu | F02D 41/0057 701/108 |
| 2013/0086887 | A1* | 4/2013 | Bergland | F01N 3/106 60/274 |
| 2015/0089938 | A1* | 4/2015 | Tanimura | F02M 26/05 60/605.2 |
| 2015/0089942 | A1* | 4/2015 | Kihara | F02M 26/05 60/605.2 |
| 2015/0090020 | A1* | 4/2015 | Takita | F01N 11/002 73/114.75 |
| 2015/0192087 | A1* | 7/2015 | Shirahashi | F02D 41/0057 701/104 |
| 2015/0247441 | A1* | 9/2015 | Takita | F01N 11/005 73/114.75 |
| 2016/0363064 | A1* | 12/2016 | Antcliff | F02D 41/123 |

OTHER PUBLICATIONS

PCT International Search Report and Written Opinion in International Appln. No. PCT/US2021/034861, dated Aug. 31, 2021, 14 pages.

* cited by examiner

ENGINE EXHAUST TREATMENT THROUGH TEMPERATURE MANAGEMENT

TECHNICAL FIELD

This disclosure relates to emission control systems for internal combustion engines.

BACKGROUND

Exhaust gas recirculation (EGR) systems can be added to internal combustion engine systems to reduce NOx emissions and reduce knock tendency. In such a system, an amount of exhaust gas is added to the air and/or fuel mixture within the air-intake manifold of the engine. The "classic" high-pressure loop EGR system plumbs the exhaust gas directly to the intake manifold.

Emission control systems for internal combustion engines commonly implement catalytic converter devices to convert harmful exhaust gases into inert gases such as carbon dioxide and water vapor. Catalytic converters reduce toxic gases and pollutants in exhaust gas into less-toxic pollutants by catalyzing a redox. Catalytic converters typically need to be at high temperatures (e.g., 800° F. or 426° C.) in order to operate as intended. Therefore, they are placed close to the engine along the exhaust line, in order to use the waste heat of the exhaust gasses to maintain an elevated operation temperature. If a catalytic converter is caused or allowed to operate below the temperature is was designed for, its efficiency will generally decrease and the engine's emissions will generally increase.

SUMMARY

In general, this document describes technologies relating to emission control systems for internal combustion engines.

In an example aspect, an engine system includes an intake manifold configured to receive and convey air to a combustion chamber, an intake valve upstream of the intake manifold and configured to regulate an air flow into the intake manifold, an exhaust manifold configured to receive combustion products from the combustion chamber, a recirculation flow passage configured to convey exhaust gasses from the exhaust manifold to the intake manifold, a recirculation flow control valve configured to regulate gas flow through the recirculation flow passage, and a controller coupled to the intake valve and the recirculation flow control valve, the controller configured to determine that the engine system is in a motoring condition, open, during the motoring condition and based the determining, the recirculation flow control valve to a specified motoring recirculation configuration, and close, during the motoring condition and based the determining, the intake valve to a specified motoring intake configuration.

Various embodiments can include some, all, or none of the following features. The intake valve can be a throttle of the engine system. Closing the intake valve to the specified motoring intake configuration can include determining a partial vacuum in the intake manifold, and adjusting the intake valve to reduce or eliminate the partial vacuum. Determining that the engine system is in the motoring condition can include determining existence of conditions that correspond to the engine system being driven by external forces to pump air from the intake manifold to the exhaust manifold. The controller can be configured to also determine that the engine system is not in a motoring condition, control, based on the determining that the engine system is not in a motoring condition, the intake valve based on a throttle demand, and control, based on the determining that the engine system is not in a motoring condition, the recirculation flow control valve based on an exhaust gas return (EGR) demand, wherein the specified motoring recirculation configuration opens the recirculation flow control valve to allow recirculation of exhaust gasses through the recirculation flow passage and the specified motoring intake configuration closes the intake valve to block the air flow into the intake manifold. The recirculation flow passage can be an exhaust gas return flow passage of an exhaust gas return (EGR) system, and the recirculation flow control valve can be an exhaust gas return flow valve of the exhaust gas return system. The engine system can also include a bypass passage configured to convey exhaust gasses around a heat exchanger of the exhaust gas return flow passage, and a bypass flow control valve configured to control gas flow through the bypass passage, wherein the controller can be further configured to open, during the motoring condition and based the determining, the bypass flow control valve, and close, based on determining that the engine system is not in a motoring condition, the bypass flow control valve.

In another example aspect, a non-transitory computer storage medium is encoded with a computer program, the computer program comprising instructions that when executed by data processing apparatus cause the data processing apparatus to perform operations including determining that an internal combustion engine is in a motoring condition, the internal combustion engine having a combustion chamber, an intake manifold configured to receive and convey air to the combustion chamber, an exhaust manifold configured to receive combustion products from the combustion chamber, and a gas recirculation flow passage configured to convey exhaust gasses from the exhaust manifold to the intake manifold through a controllable exhaust gas recirculation control valve, opening, during the motoring condition and based the determining, a recirculation flow control valve configured to a specified motoring recirculation configuration to regulate gas flow through the recirculation flow passage, and closing, during the motoring condition and based the determining, an intake valve arranged upstream of the intake manifold, to a specified motoring intake configuration to restrict air flow to the intake manifold.

Various implementations can include some, all, or none of the following features. The intake valve can be a throttle of the internal combustion engine. Closing the intake valve to the specified motoring intake configuration can include determining a partial vacuum in the intake manifold, and adjusting the intake valve to reduce or eliminate the partial vacuum. Determining that the internal combustion engine is in the motoring condition can include determining existence of conditions that correspond to the internal combustion engine being driven by external forces to pump air from the intake manifold to the exhaust manifold. The operations can also include determining that the internal combustion engine is not in a motoring condition, controlling, based on the determining that the internal combustion engine is not in a motoring condition, the intake valve based on a throttle demand, and controlling, based on the determining that the internal combustion engine is not in a motoring condition, the recirculation flow control valve based on an exhaust gas return (EGR) demand.

In another example aspect, a method includes determining that an internal combustion engine is in a motoring condition, the internal combustion engine having a combustion chamber, an intake manifold configured to receive and convey air to the combustion chamber, an exhaust manifold configured to receive combustion products from the combustion chamber, and a gas recirculation flow passage configured to convey exhaust gasses from the exhaust manifold to the intake manifold through a controllable recirculation flow control valve, opening, during the motoring condition and based the determining, a recirculation flow control valve to a specified motoring recirculation configuration to regulate gas flow through the recirculation flow passage, and at least partly closing, during the motoring condition and based the determining, an intake valve arranged upstream of the intake manifold, to a specified motoring intake configuration to restrict air flow to the intake manifold.

Various implementations can include some, all, or none of the following features. The intake valve can be a throttle of the internal combustion engine. Closing the intake valve to the specified motoring intake configuration can include determining a partial vacuum in the intake manifold, and adjusting the intake valve to reduce or eliminate the partial vacuum. Determining that an internal combustion engine is in the motoring condition can include determining existence of conditions that correspond to the internal combustion engine being driven by external forces to pump air from the intake manifold to the exhaust manifold. The method can also include determining that the internal combustion engine is not in a motoring condition, controlling, based on the determining that the internal combustion engine is not in a motoring condition, the intake valve based on a throttle demand, and controlling, based on the determining that the internal combustion engine is not in a motoring condition, the recirculation flow control valve based on an exhaust gas return (EGR) demand. The specified motoring recirculation configuration can open the recirculation flow control valve to allow recirculation of exhaust gasses through the recirculation flow passage, and the specified motoring intake configuration can close the intake valve to block the air flow into the intake manifold. The method can also include opening, during the motoring condition and based the determining, a bypass control flow valve configured to control gas flow through a bypass passage, wherein the bypass passage is configured to convey exhaust gasses around a heat exchanger arranged in the gas recirculation flow passage, determining that the internal combustion engine is not in a motoring condition, and closing, based on determining that the internal combustion engine is not in a motoring condition, the bypass flow control valve. The method can also include modifying the internal combustion engine, the modifying including providing the recirculation flow passage, providing the recirculation flow control valve, fluidically connecting the recirculation flow passage to the exhaust manifold at a first end of the recirculation flow passage, fluidically connecting the recirculation flow passage to the intake manifold at a second end of the recirculation flow passage, and providing a controller configured to determine the motoring condition and control the recirculation control valve and the intake valve based on the motoring condition.

The systems and techniques described here may provide one or more of the following advantages. First, a system can reduce or eliminate the amount of temperature drop within catalytic converters during operation of internal combustion engines. Second, the system can provide improved emissions performance for internal combustion engines. Third, for some engine configurations, the improvement can be implemented with minimal or no modification modifications.

The details of one or more implementations are set forth in the accompanying drawings and the description below. Other features and advantages will be apparent from the description and drawings, and from the claims.

DETAILED DESCRIPTION

This document describes systems and techniques for controlling and improving the performance of emission control systems for internal combustion engines. In general, catalytic converter system are designed to operate at high temperatures, and those temperatures are typically achieved as a byproduct of the waste heat provided by the exhaust gasses they are designed to treat. However, in some situations, much cooler exhaust gasses can be caused to pass though the catalytic converter, thus cooling the catalytic converter and reducing its ability to remove pollutants until it can be brought back up to a proper operational temperature. This document describes solutions that reduces or stops the flow of cool exhaust gasses though the emissions control system, which helps maintain high catalytic converter temperatures and help maintain the efficiency of the after-treatment it provides to exhaust gasses.

An example of situation in which a catalytic converter can be cooled can occur when an engine is motoring or engine braking. When a vehicle is decelerating based on engine resistance, fuel supply to the engine is nearly or completely stopped, and the forward motion and momentum of the vehicle causes the engine to keep turning (e.g., based on rotation fed back from the turning drive wheels and drive train to the engine). Under conditions such as these, the engine essentially acts as an air pump, with the rotation of the engine drawing cool air from an intake, through the cylinders without heat-generating combustion, and out the exhaust to the catalytic converter. This cool, uncombusted air, cools the catalytic converter. When the engine resumes combustion to provide drive power, the combusted gasses pass through the cooled catalytic converter and are treated with a lower degree of effectiveness and/or efficiency until the converter's temperature recovers. During such times, the exhaust gasses can contain a relatively higher level of pollutants, possibly high enough to cause the engine (or the vehicle it is in) to fail emissions tests.

In general, this document describes solutions that reduce or prevent such losses in exhaust after-treatment efficiency and/or effectiveness by reducing the cooling effect described in the previous paragraph. As will be described in more detail in the remainder of this document, in general this improvement in performance is achieved by detecting a motoring condition and responding by recycling hot exhaust gasses back through the engine, rather than allow the engine to ingest cool intake air and pump it through the catalytic converter.

Figure 1:
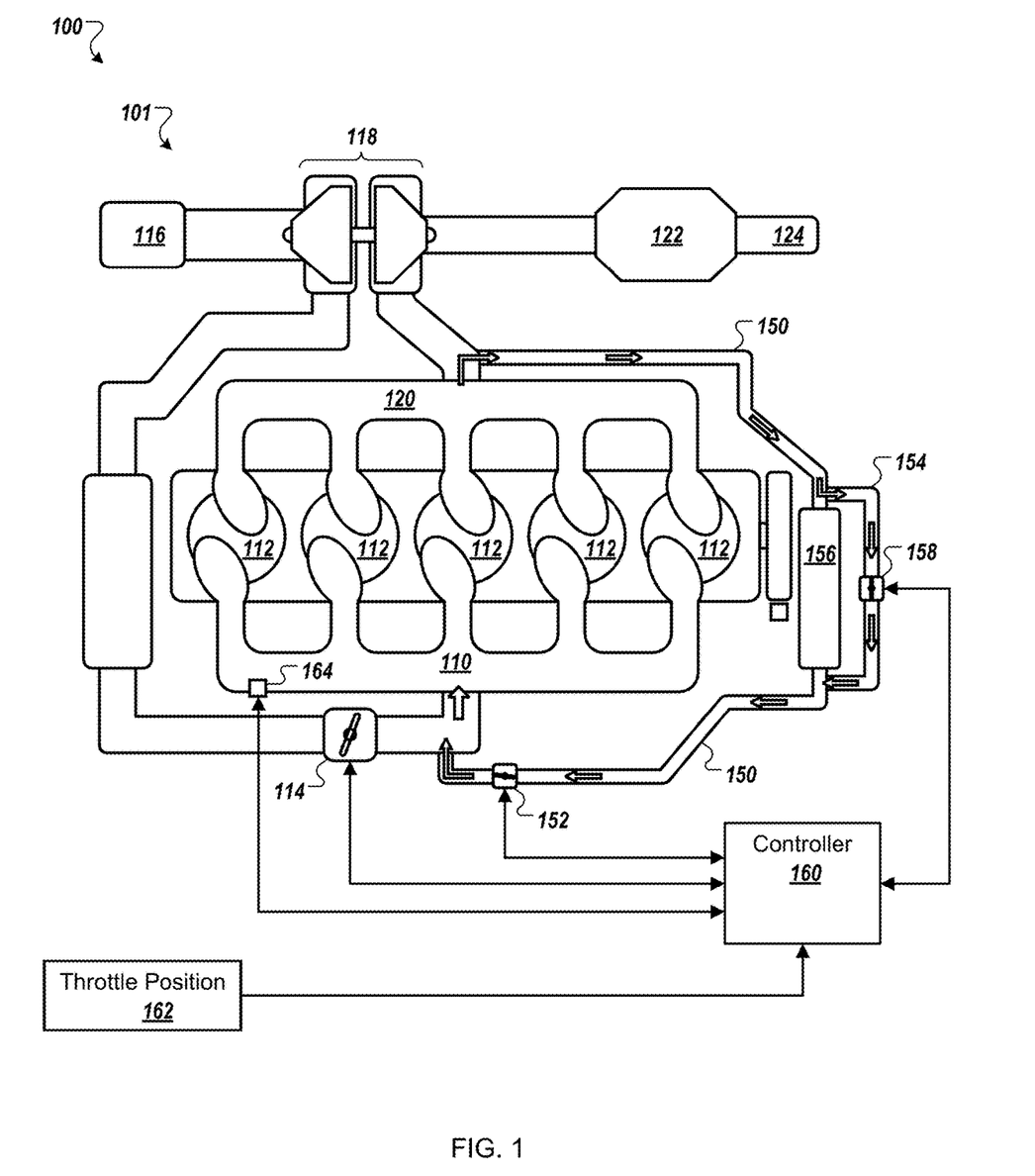
FIG. 1 is a schematic diagram that shows an example of a system for temperature management in an exhaust after-treatment system.

FIG. 1 is a schematic diagram that shows an example of an engine system 100 for temperature management in an exhaust after-treatment system. In some examples, engine exhaust after-treatment efficiency is typically related to catalyst temperature, where a low temperature can result in low after-treatment efficiency. Maintaining the temperature high enough during normal operation can be challenging. One of the challenges in particular is during motoring conditions, where the motion of the wheels of a vehicle, when it is connected to the engine (e.g., automatic transmission in drive or manual in gear with clutch engaged), will keep the engine rotating and the fuel can be shut off (e.g., to improve fuel economy of the vehicle). But, when fuel is shut off, un-combusted air flows though the engine, and much cooler air flows through the catalyst, reducing the temperature of the catalyst. If the temperature of the catalyst goes too low, the conversion efficiency can be reduced and exhaust emissions can go up. An engine can fail an emissions certification test if conversion efficiency goes too low. This could be any engine with any appropriate fuel, including, but not limited to, gasoline, diesel, natural gas, propane, and any fuel that an internal combustion engine can use in order to operate.

Internal combustion engines can produce harmful emissions from the exhaust gasses. These emissions are regulated by government agencies, such as the Environmental Protection Agency in the United States. Typical emissions that are regulated include (but are not limited to) oxides of nitrogen (NOx), carbon monoxide (CO), and hydrocarbons (HC) (e.g., including methane). To reduce emissions in the exhaust gas to the regulated levels, exhaust after treatment is used, typically in the form of a catalyst (e.g., in a catalytic converter). Exhaust after-treatment typically implements high temperatures to be effective at reducing emissions. For example, for some catalysts a temperature of about 462° C. may be needed to get about a 90% conversion efficiency for methane. Natural gas engines, such as the OH6 applications, in particular can have an issue with meeting methane emissions because of the higher temperature requirement compared to other regulated emissions for high conversion efficiency.

The system 100 includes an internal combustion engine 101 having an intake manifold 110 configured to receive and convey air to a collection of combustion chambers 112. An intake valve 114 is arranged upstream of the intake manifold 110, and is configured to at least partially regulate an airflow from an air intake 116 through a compressor 118 (e.g., turbo) into the intake manifold 110. The engine 101 also includes an exhaust manifold 120 configured to receive combustion products (e.g., exhaust gasses) from the combustion chamber 112, and a catalytic converter 122 configured to provide after-treatment of the exhaust gasses before they exit an exhaust outlet 124 (e.g., tailpipe).

In some embodiments, the intake valve 114 can be a valve that is added to an existing intake system. For example, an existing engine system can be modified by adding the intake valve 114 and other exhaust temperature management components that will be described below. In some embodiments, the intake valve 114 can be an existing throttle valve of an engine. For example, the operation of an engine's throttle body can be modified to perform additional functions associated with exhaust temperature management, as will be discussed in more detail below.

The system 100 also includes a recirculation flow passage 150 that is configured to convey exhaust gasses from the exhaust manifold 120 to the intake manifold 110. A controllable exhaust gas recirculation flow control valve 152 is configured to regulate gas flow through the recirculation flow passage 150. The recirculation flow passage 150 includes a bypass passage 154 configured to convey exhaust gasses around a heat exchanger 156 (e.g., intercooler) of the recirculation flow passage 150 and a bypass flow control valve 158 configured to control gas flow through the bypass passage 154.

In some embodiments, the recirculation flow passage 150 and its components can be a collection of components that can added or retrofitted to an existing engine system. In some embodiments, recirculation flow passage 150 can be an exhaust gas return flow passage of an exhaust gas return (EGR) system, and the recirculation flow control valve is an exhaust gas return flow valve of the exhaust gas return system. For example, an otherwise stock (e.g., factory supplied) EGR system can be repurposed to perform the additional functions of the recirculation flow passage 150.

The system 100 also includes a controller 160 (e.g., a standalone controller, controller functions integrated with an engine control unit (ECU)) coupled to the intake valve 114 and the recirculation flow control valve 152. The controller 160 is configured to determine the existence of conditions that correspond to the engine system 100 being in a motoring condition (e.g., the engine 101 is being driven by external mechanical forces to pump air from the intake manifold 110 to the exhaust manifold 120) or is otherwise being caused to ingest and exhaust cool air. In some implementations, the motoring or other conditions can be determined from a throttle position signal 162, engine RPMs, engine vacuum, an ECU output, exhaust temperature, an accelerometer, or combinations of these and/or any other appropriate input that can be used to determine if the engine 101 is operating under conditions that might exhaust cool air through the catalytic converter 122. The controller 160 is configured to detect such operating conditions and respond by opening the recirculation flow control valve 152 and the bypass flow control valve 158 during the motoring (or other) condition, and close the intake valve 114, during the motoring (or other) condition.

The intake manifold 110 includes a pressure sensor 164. The controller 160 is also configured receive sensor signals from the pressure sensor 164 to determine a partial vacuum in the intake manifold 110 and, in response, adjust the intake valve 114 to reduce or eliminate the partial vacuum. Depending on the flow capacity of the recirculation flow passage 150, a small throttle opening (e.g., and small flow rate) may be commanded to prevent significant vacuum in intake manifold 110. However, the majority of the flow through the engine 101 during motoring is thorough the recirculation flow passage 150.

To reduce the amount of cold air that flows through the exhaust after-treatment during motoring events, the recirculation flow passage 150 works as follows. Suppose the engine 101 is a four-stroke engine. During motoring, there is not any firing event, when cylinder 1 is in intake stroke, the piston in cylinder 1 moves downwards to create a vacuum in the intake manifold 110 lower than ambient air pressure. At the same time, both cylinder 3 and cylinder 5 are partially in exhaust stroke, which means the pistons in these two cylinders are moving upwards and provide pressure potential to drive flow into cylinder 1 through the recirculation flow passage 150, as the intake manifold 110 is kept under ambient condition. Similar sequences take place for the other cylinders to keep the recirculation flow passage 150 actively flowing warm gas in a circuit, and only small amount of flow passes through exhaust after-treatment. In this way, the exhaust after-treatment temperature remains high. The recirculation flow passage 150, and/or the intake valve 114 can be opened to avoid excessive vacuum in the intake manifold 110 and to limit the amount of fresh cold air passing through the exhaust after-treatment while reducing the vacuum in the intake manifold 110.

In the illustrated example, the system 100 is in a temperature management configuration. The controller 160 has closed the intake valve 114 to a specified or predetermined motoring intake configuration, opened the recirculation flow control valve 152 a specified or predetermined motoring recirculation configuration, and opened the bypass flow control valve 158 (e.g., in response to determining that a motoring condition exists). In this configuration, cool or cold air from the air intake 116 is mostly or entirely prevented from entering the engine 101, and hot exhaust gasses in the exhaust manifold 120 are recycled back to the intake manifold 110 through the recirculation flow passage 150, bypassing the heat exchanger 156. The recirculated hot exhaust gasses re-enter the intake manifold and are pumped through the combustion chambers 112 (e.g., by engine pistons driven by the motoring condition) to the exhaust manifold 120 again.

By recycling the hot exhaust gasses through the engine 101 and by preventing cold fresh air from being pumped to the exhaust manifold 120 and out through the catalytic converter 122, cool fresh air can be prevented from being provided to the catalytic converter 122, and the resulting cooling effect of the cool fresh air can be avoided, which can reduce or avoid the resulting temperature drop in the catalytic converter 122. With the temperature of the catalytic converter 122 maintained high, at or near its designed operational temperature, the effectiveness of the catalytic converter 122 at removing pollutants remains at or near its designed operational levels. In situations in which a temperature drop in the catalytic converter 122 is unavoidable (e.g., long periods of downhill motoring), the recycling technique can reduce the cooling effect that would otherwise happen. By reducing the temperature drop, the amount of time that the catalytic converter 122 needs to return to its designed operational temperature after normal combustion processes resume is reduced, the amount of time the catalytic converter 122 operates at less than its designed efficiency is reduced. By reducing either or both the negative impact of cooling and the amount of time during which the negative impact exists, the total increase in tailpipe emissions due to motoring is also reduced.

Figure 2:
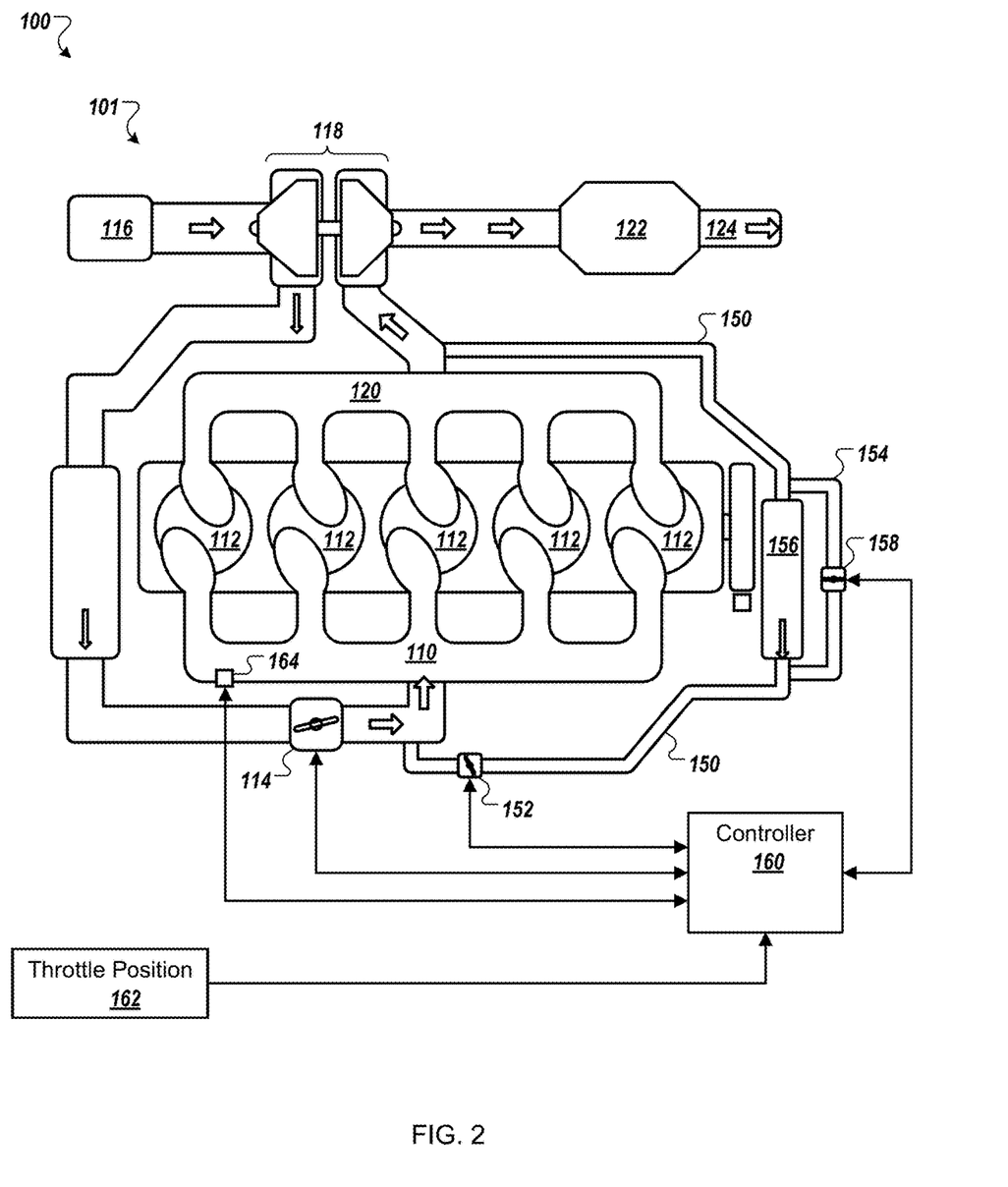
FIG. 2 is a schematic diagram that shows the example system of FIG. 1 in another operational configuration.

FIG. 2 is a schematic diagram that shows the example system 100 of FIG. 1 in another operational configuration. In the example of FIG. 1, the system is shown in a recycling or motoring configuration (e.g., the controller 160 has detected a motoring condition and has configured the system 100 to preserve catalytic temperatures by recycling hot exhaust). In the example of FIG. 2, the system is shown in a non-recycling or non-motoring (e.g., normal operational condition).

In the illustrated example, the intake valve 114 is controlled (e.g., opened) based on a throttle position signal 162 (e.g., a throttle demand), and the recirculation flow control valve 152 is controlled (e.g., by the controller 160 or an ECU) based on an exhaust gas return EGR demand. For example, the controller 160 can determine that the engine system 100 is not in a motoring condition, and run the engine 101 in a normal operational mode in which the intake valve 114 (e.g., a throttle) is based on a throttle input such as an accelerator pedal or a governor, and the recirculation flow control valve 152 can be shut completely or it can be controllably opened to perform EGR functions for the engine 101.

Figure 3:
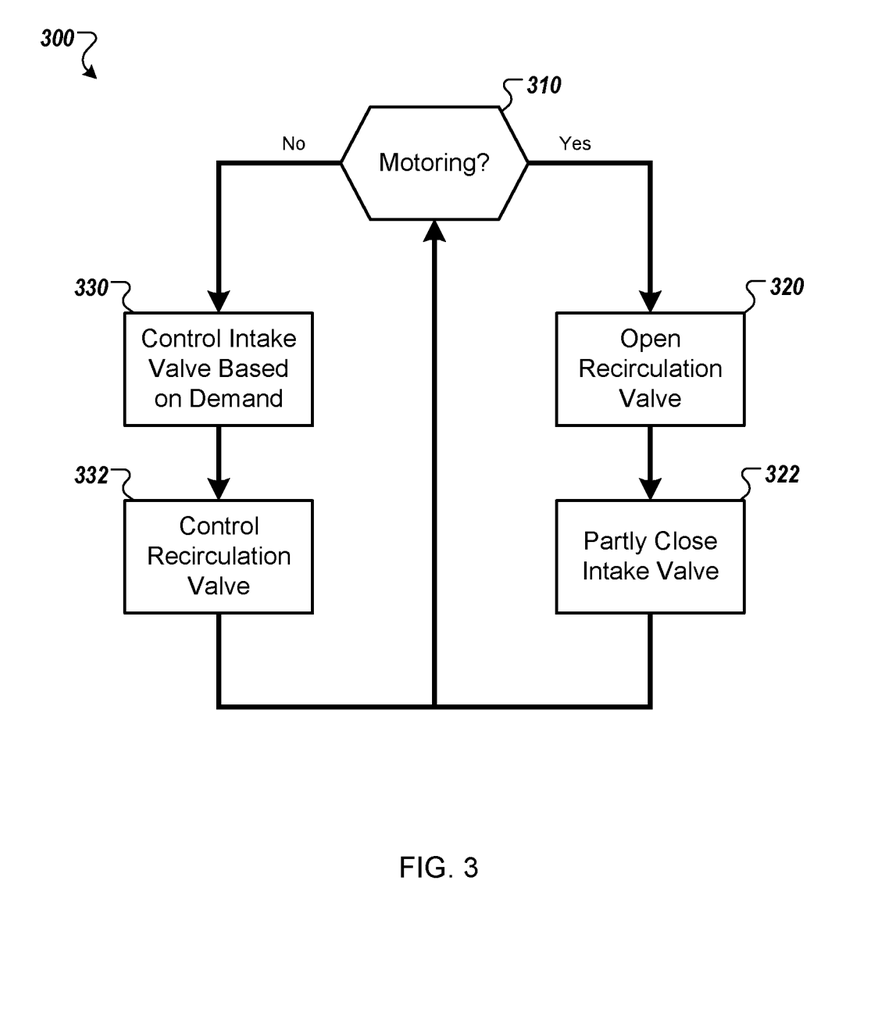
FIG. 3 is flow chart that shows an example of a process for temperature management in an exhaust after-treatment system.

FIG. 3 is flow chart that shows an example of a process 300 for temperature management in an exhaust after-treatment system. In some implementations, the process 300 can be performed by the example engine system 100 of FIGS. 1 and 2.

At 310, a determination is made. If an internal combustion engine is in a motoring condition, then the process 300 continues at 320. If not, then the process continues at 330. In some implementations, determining that the internal combustion engine is in the motoring condition can include determining that the internal combustion engine is being driven by external forces to pump air from the intake manifold to the exhaust manifold. For example, the example controller 160 of FIGS. 1 and 2 can determine whether or not the engine system 100 is in a motoring condition or any other appropriate condition that can cause relatively cooler air to flow through and potentially reduce the relatively hotter temperature of the catalytic converter 122.

At 320, a recirculation flow control valve, configured to regulate gas flow through the recirculation flow passage, is opened during the motoring condition based the determining. For example, the recirculation flow control valve 152 is opened to fluidically connect the exhaust manifold 120 to the intake manifold 110 through the recirculation flow passage 150, as shown in FIG. 1.

At 322, an intake valve, arranged upstream of the intake manifold and configured to restrict airflow to the intake manifold, is closed during the motoring condition based the determining. For example, the intake valve 114 is completely or nearly closed to block or reduce the flow of cool air from the air intake 116 to the intake manifold 110, as shown in FIG. 1. In some embodiments, the intake valve can be a throttle of the internal combustion engine 101.

In some implementations, closing the intake valve can include determining a partial vacuum in the intake manifold, and adjusting the intake valve to reduce or eliminate the partial vacuum. For example, the controller 160 can receive air pressure sensor signals from the pressure sensor 164 to identify that the operation of the engine 101 is drawing the air pressure in the intake manifold 110 below a specified pressure (e.g., ambient air pressure), and respond by partly opening the intake valve 114 to allow additional air to enter the intake manifold 110.

At 330, the intake valve is controlled based on a throttle demand, based on determining that the internal combustion engine is not in a motoring condition. For example, controller 160 can determine that the engine 101 is operating normally (e.g., not motoring) and cause the intake valve 114 to open and close based on the throttle position signal 162 (e.g., accelerator pedal, governor, cruise control).

At 332, the recirculation flow control valve is controlled based on the determining that the internal combustion engine is not in a motoring condition. For example, in embodiments in which the engine system 100 is not configured to perform EGR functions, the controller 160 can close the recirculation flow control valve 152 to resist gas flow from the exhaust manifold 120 to the intake manifold 110 through the recirculation flow passage 150. In another example, in embodiments in which the engine system 100 is configured to perform EGR functions using the recirculation flow passage 150, the controller 160 can controllably open and close the recirculation flow control valve 152 to perform EGR functions for the engine 101.

In some implementations, the process 300 can also include opening, during the motoring condition and based the determining, a bypass control flow valve configured to control gas flow through a bypass passage, wherein the bypass passage is configured to convey exhaust gasses around a heat exchanger arranged in the gas recirculation flow passage, determining that the internal combustion engine is not in a motoring condition, and closing, based on determining that the internal combustion engine is not in a motoring condition, the bypass flow control valve. For example, the recirculation flow passage 150 includes the heat exchanger 156, which in some embodiments can be an exhaust gas intercooler that is used to cool exhaust gasses during EGR operations, but would provide unwanted cooling during motoring conditions. During motoring, the bypass flow control valve 158 can be opened to allow hot gasses to bypass the heat exchanger 156 through the bypass passage 154. During non-motoring (e.g., normal) engine operating conditions, the bypass flow control valve 158 can be closed to direct hot gasses through the heat exchanger 156.

In some implementations, the process 300 can include providing the recirculation flow passage, providing the recirculation flow control valve, fluidically connecting the recirculation flow passage to the exhaust manifold at a first end of the recirculation flow passage, fluidically connecting the recirculation flow passage to the intake manifold at a second end of the recirculation flow passage, providing a controller configured to determine the motoring condition and control the recirculation control valve and the intake valve based on the motoring condition. For example, the recirculation flow passage 150 and its components can be a collection of components that can added or retrofitted to an existing engine system.

Figure 4:
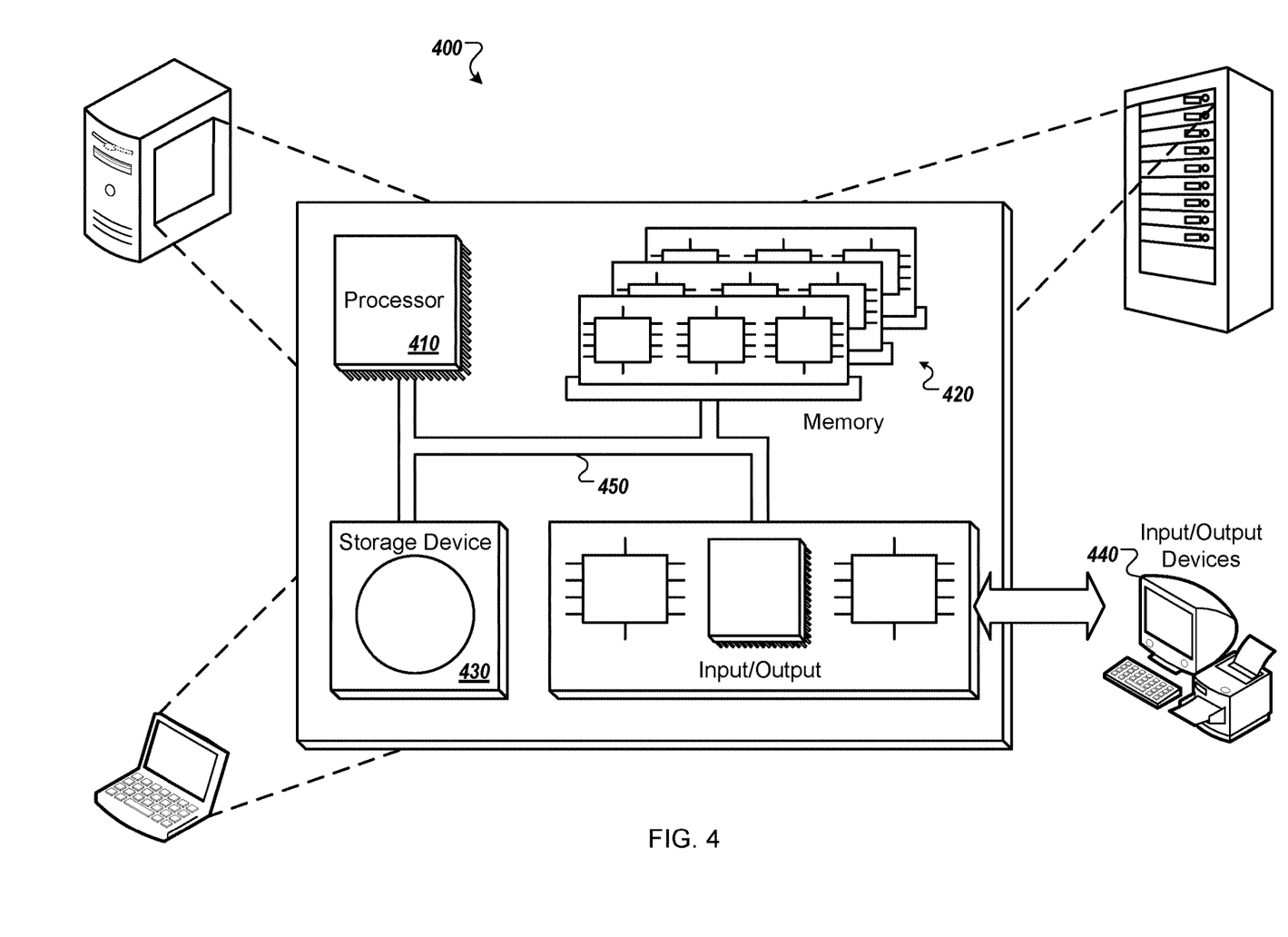
FIG. 4 is a schematic diagram of an example of a generic computer system.

FIG. 4 is a schematic diagram of an example of a generic computer system 400. The system 400 can be used for the operations described in association with the process 300 according to one implementation. For example, the system 400 may be included in all or part of the example controller 160 of FIGS. 1 and 2.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of this disclosure.

What is claimed is:

1. An engine system comprising:
   an intake manifold configured to receive and convey air to a combustion chamber;
   an intake valve upstream of the intake manifold and configured to regulate an air flow into the intake manifold;
   an exhaust manifold configured to receive combustion products from the combustion chamber;
   a recirculation flow passage configured to convey exhaust gasses from the exhaust manifold to the intake manifold;
   a recirculation flow control valve configured to regulate gas flow through the recirculation flow passage; and
   a controller coupled to a sensor, the intake valve, and the recirculation flow control valve, and including non-transitory executable instructions stored in a memory to:
      determine that the engine system is in a motoring condition;
      open, during the motoring condition and based the determining, the recirculation flow control valve to a specified motoring recirculation configuration;
      close, during the motoring condition and based the determining, the intake valve to a specified motoring intake configuration;
      determine a partial vacuum in the intake manifold; and
      adjust the intake valve to reduce or eliminate the partial vacuum.

2. The engine system of claim 1, wherein the intake valve is a throttle of the engine system.

3. The engine system of claim 1, wherein determining that the engine system is in the motoring condition comprises determining existence of conditions that correspond to a piston of the combustion chamber of the engine system being driven by external forces to pump air from the intake manifold to the exhaust manifold through the combustion chamber.

4. The engine system of claim 1, wherein the controller further comprises executable instructions to:
   determine that the engine system is not in the motoring condition;
   control, based on the determining that the engine system is not in the motoring condition, the intake valve based on a throttle demand; and
   control, based on the determining that the engine system is not in the motoring condition, the recirculation flow control valve based on an exhaust gas return (EGR) demand;
   wherein the specified motoring recirculation configuration opens the recirculation flow control valve to allow recirculation of exhaust gasses through the recirculation flow passage and the specified motoring intake configuration closes the intake valve to block the air flow into the intake manifold.

5. The engine system of claim 1, wherein the recirculation flow passage is an exhaust gas return flow passage of an exhaust gas return (EGR) system, and the recirculation flow control valve is an exhaust gas return flow valve of the exhaust gas return system.

6. The engine system of claim 5, further comprising:
   a bypass passage configured to convey, exhaust gasses around a heat exchanger of the exhaust gas return flow passage; and
   a bypass flow control valve configured to control gas flow through the bypass passage;
      wherein the controller comprises further executable instructions to;
         open, during the motoring condition and based the determining, the bypass flow control valve; and
         close, based on determining that the engine system is not in the motoring condition, the bypass flow control valve.

7. A non-transitory computer storage medium encoded with a computer program, the computer program comprising instructions that when executed by data processing apparatus cause the data processing apparatus to perform operations comprising:
   determining that an internal combustion engine is in a motoring condition, the internal combustion engine having a combustion chamber, an intake manifold configured to receive and convey air to the combustion chamber, an exhaust manifold configured to receive combustion products from the combustion chamber, and a gas recirculation flow passage configured to convey exhaust gasses from the exhaust manifold to the intake manifold through a controllable exhaust gas recirculation control valve;
   opening, during the motoring condition and based the determining, a recirculation flow control valve to a specified motoring recirculation configuration to regulate gas flow through the recirculation flow passage;
   closing, during the motoring condition and based the determining, an intake valve arranged upstream of the intake manifold, to a specified motoring intake configuration to restrict air flow to the intake manifold;
   determining a partial vacuum in the intake manifold; and
   adjusting the intake valve to reduce or eliminate the partial vacuum.

8. The non-transitory computer storage medium of claim 7, wherein the intake valve is a throttle of the internal combustion engine.

9. The non-transitory computer storage medium of claim 7, wherein determining that the internal combustion engine is in the motoring condition comprises determining existence of conditions that correspond to a piston of the combustion chamber of the internal combustion engine being driven by external forces to pump air from the intake manifold to the exhaust manifold through the combustion chamber.

10. The non-transitory computer storage medium of claim 7, the operations further comprising:
   determining that the internal combustion engine is not in the motoring condition; controlling, based on the determining that the internal combustion engine is not in the motoring condition, the intake valve based on a throttle demand; and controlling, based on the determining that the internal combustion engine is not in the motoring condition, the recirculation flow control valve based on an exhaust gas return (EGR) demand.

11. A method of operating an engine system including a controlled having non-transitory instructions stored in a memory to execute operations comprising:
 determining that an internal combustion engine is in a motoring condition, the internal combustion engine having a combustion chamber, an intake manifold configured to receive and convey air to the combustion chamber, an exhaust manifold configured to receive combustion products from the combustion chamber, and a gas recirculation flow passage configured to convey exhaust gasses from the exhaust manifold to the intake manifold through a controllable recirculation flow control valve;
 opening, during the motoring condition and based the determining, the controllable recirculation flow control valve to a specified motoring recirculation configuration to regulate gas flow through the recirculation flow passage;
 closing, during the motoring condition and based the determining, an intake valve arranged upstream of the intake manifold, to a specified motoring intake configuration to restrict air flow to the intake manifold;
 determining a partial vacuum in the intake manifold; and
 adjusting the intake valve to reduce or eliminate the partial vacuum.

12. The method of claim 11, wherein the intake valve is a throttle of the internal combustion engine.

13. The method of claim 11, wherein determining that an internal combustion engine is in the motoring condition comprises determining existence of conditions that correspond to a piston of the combustion chamber of the internal combustion engine being driven by external forces to pump air from the intake manifold to the exhaust manifold through the combustion chamber.

14. The method of claim 11, further comprising:
 determining that the internal combustion engine is not in the motoring condition;
 controlling, based on the determining that the internal combustion engine is not in the motoring condition, the intake valve based on a throttle demand; and
 controlling, based on the determining that the internal combustion engine is not in the motoring condition, the recirculation flow control valve based on an exhaust gas return (EGR) demand.

15. The method of claim 11, wherein:
 the specified motoring recirculation configuration opens the recirculation flow control valve to allow recirculation of exhaust gasses through the recirculation flow passage; and
 the specified motoring intake configuration closes the intake valve to block the air flow into the intake manifold.

16. The method of claim 11, further comprising:
 opening, during the motoring condition and based the determining, a bypass control flow valve configured to control gas flow through a bypass passage, wherein the bypass passage is configured to convey exhaust gasses around a heat exchanger arranged in the gas recirculation flow passage;
 determining that the internal combustion engine is not in the motoring condition; and
 closing, based on determining that the internal combustion engine is not in the motoring condition, the bypass flow control valve.

17. The method of claim 11, further comprising modifying the internal combustion engine, the modifying comprising:
 providing the recirculation flow passage;
 providing the recirculation flow control valve;
 fluidically connecting the recirculation flow passage to the exhaust manifold at a first end of the recirculation flow passage;
 fluidically connecting the recirculation flow passage to the intake manifold at a second end of the recirculation flow passage; and
 providing a controller configured to determine the motoring condition and control the recirculation control valve and the intake valve based on the motoring condition.

* * * * *

UNITED STATES PATENT AND TRADEMARK OFFICE
CERTIFICATE OF CORRECTION

PATENT NO. : 11,225,921 B2
APPLICATION NO. : 16/887587
DATED : January 18, 2022
INVENTOR(S) : Han et al.

It is certified that error appears in the above-identified patent and that said Letters Patent is hereby corrected as shown below:

On the Title Page

Item (57) (Abstract), Lines 15-16, delete "based the" and insert -- based on the --;

In the Specification

Column 1, Line 29, delete "is was" and insert -- it was --;

Column 1, Line 50, delete "based the" and insert -- based on the --;

In the Claims

Column 12, Line 11 (approx.), Claim 6, delete "convey, exhaust" and insert -- convey exhaust --;

Column 12, Line 17 (approx.), Claim 6, delete "to;" and insert -- to: --;

Column 12, Lines 18-19 (approx.), Claim 6, delete "based the" and insert -- based on the --.

Signed and Sealed this
Nineteenth Day of July, 2022

Katherine Kelly Vidal
*Director of the United States Patent and Trademark Office*